United States Patent Office 3,714,082
Patented Jan. 30, 1973

3,714,082
INTUMESCENT COATING COMPOSITION
Shirley H. Roth, Highland Park, and Joseph Green, East Brunswick, N.J., and John J. Seipel, Ambler, Pa., assignors to Cities Service Company, New York, N.Y.
No Drawing. Filed May 15, 1972, Ser. No. 253,584
Int. Cl. C08 1/20
U.S. Cl. 260—2.5 FP
2 Claims

ABSTRACT OF THE DISCLOSURE

Dipentaerythritol is used to improve the homogeneity, and thus the effectiveness, of the foamed char produced by the intumescence of p,p'-oxybis(benzenesulfonamide) in a vinyl chloride/vinylidene chloride copolymer binder.

BACKGROUND OF THE INVENTION

Field of the invention

This invention relates to intumescent coating compositions and more particularly relates to such compositions comprising p,p'-oxybis(benzenesulfonamide) and a vinyl chloride/vinylidene chloride copolymer.

Description of the prior art

As disclosed in copending application S.N. 196,229, filed Nov. 5, 1971, in the name of Shirley H. Roth, a substrate may advantageously be protected from heat and fire by the application thereto of an intumescent composition comprising a novel one-component intumescent agent, e.g., p,p' - oxybis(benzenesulfonamide). The intumescent agent is preferably compounded with a binder before being applied to the substrate to be protected, and copending application S.N. 196,230, filed Nov. 5, 1971, in the names of Joseph Green, Shirley H. Roth, and John J. Seipel teaches that the binder may be a vinyl chloride/vinylidene chloride copolymer having a decomposition temperature in the range of about 215–340° C.

It has been found that the use of such a vinyl chloride/vinylidene chloride copolymer binder with p,p'-oxybis(benzenesulfonamide) is particularly advantageous in that it renders the normally self-extinguishing intumescent agent non-flaming. However, it has the disadvantage of leading to the formation of a heterogeneous char having hills, craters, and valleys, in contrast to the homogeneous char formed from the neat intumescent agent. This heterogeneity decreases the effectiveness of the char in protecting the substrate.

SUMMARY OF THE INVENTION

An object of this invention is to provide novel intumescent coating compositions.

Another object is to improve the homogeneity of the foamed char produced by the intumescence of p,p'-oxybis(benzenesulfonamide) in a vinyl chloride/vinylidene chloride copolymer binder.

These and other objects are attained by intimately mixing dipentaerythritol with an intumescent coating composition comprising a p,p'-oxybis(benzenesulfonamide) intumescent agent and a vinyl chloride/vinylidene chloride copolymer binder having a decomposition temperature in the range of about 215–340° C.

DESCRIPTION OF THE PREFERRED EMBODIMENTS

As stated above, the intumescent agent is p,p'-oxybis(benzenesulfonamide), the binder is a vinyl chloride/vinylidene chloride copolymer having a decomposition temperature in the range of about 215–340° C., and the char-homogenizer is dipentaerythritol. The ratio of vinyl chloride to vinylidene chloride in the copolymer is not critical. However, as taught in the aforementioned application S.N. 196,230, its decomposition temperature is critical and must be in the defined range.

These ingredients of the coating composition are combined in any suitable manner, e.g., by grinding them together, to provide a composition containing about 0.075–14 parts by weight of intumescent agent per part of binder and about 0.03–0.25 part by weight of char-homogenizer per part of intumescent agent. When desired, the composition may also contain up to about 70%, based on the weight of the total composition, of one or more of the other ingredients conventionally used in intumescent compositions, e.g., stabilizers, dispersing agents, pigments, driers, biocides, anti-foamers, thickeners, protective colloids, fillers, blowing agents, etc.

The composition may be applied to the substrate to be protected, e.g., a wood, paper, metal, or plastic substrate, in any suitable manner, such as by fluidized bed coating, spraying, electrodeposition, etc. However, it is preferably applied in the form of a paint having a solids content of about 10–70% by weight and comprising a dispersion in a suitable liquid medium, e.g., water or a solvent or solvent mixture. Regardless of the method used to apply the intumescent coating, it is preferably applied so as to deposit a coating having a dry thickness of about 0.001–0.75 inch.

The use of dipentaerythritol reduces or eliminates the macroscopic hills, craters, and valleys of the foamed char produced by intumescence of the composition and thus improves its effectiveness. Consequently, substrates coated with the intumescent compositions of the invention have lower flame spread ratings and insulative values.

The following examples are given to illustrate the invention and are not intended as a limitation thereof. Unless otherwise specified, quantities mentioned are quantities by weight.

EXAMPLE I—CONTROL

Ball mill a mixture of 100 parts of p,p'-oxybis(benzenesulfonamide), 32 parts of a vinyl chloride/vinylidene chloride copolymer having a decomposition temperature of about 260° C., 7.1 parts of titanium dioxide, and 125 parts of methyl isobutyl ketone to form a coating composition. Apply the composition to four poplar test panels to form films having a dry thickness of 0.012–0.014 inch. Test the panels in accordance with the two-foot tunnel test described in H. L. Vandersall, "The Use of a Small Flame Tunnel for Evaluating Fire Hazard," Journal of Paint Technology, vol. 39, No. 511, pp. 494–500 (1967). The foamed char is heterogeneous; the panels have an average flame spread rating of 29, an average insulative value of 124° C., and an average degree of intumescence of 11 mm.

EXAMPLE II

Repeat Example I except for also including 12 parts of dipentaerythritol in the mixture which is ball milled to form the coating composition. The foamed char is homogeneous; the panels have an average flame spread rating of 11, an average insulative value of 95° C., and an average degree of intumescence of 14 mm.

It is obvious that many variations may be made in the products and processes set forth above without departing from the spirit and scope of this invention.

What is claimed is:
1. An intumescent coating composition comprising (A) a p,p'-oxybis(benzenesulfonamide) intumescent agent, (B) a vinyl chloride/vinylidene chloride copolymer binder having a decomposition temperature in the range of about 215–340° C., and (C) about 3–25%, based on the weight of the intumescent agent, of dipentaerythritol as a char-homogenizing agent.

2. The composition of claim 1 wherein the intumescent agent/binder weight ratio is about 0.075–14/1.

References Cited

UNITED STATES PATENTS 2,616,866 11/1952 Juda _____ 260—2.5 FP
3,296,340 1/1967 Eichhorn _____ 260—2.5 FP SAMUEL H. BLECH, Primary Examiner M. FOELAK, Assistant Examiner U.S. Cl. X.R.

117—132 C, 132 B, 132 BE, 132 BF, 138.8 A, 148, 161 KP, 161 LN, 161 UZ, 161 UN, 161 UF, 161 ZB, 161 H; 260—2.5 R, DIG. 24